US012619313B2

(12) United States Patent   (10) Patent No.: US 12,619,313 B2
Du Chalard et al.   (45) Date of Patent: May 5, 2026

(54) ORIENTATION ASSISTANCE SYSTEM COMPRISING MEANS FOR ACQUIRING A REAL OR VIRTUAL VISUAL ENVIRONMENT, NON-VISUAL HUMAN-MACHINE INTERFACE MEANS AND MEANS FOR PROCESSING THE DIGITAL REPRESENTATION OF SAID VISUAL ENVIRONMENT

(71) Applicant: Artha France, Versailles (FR)

(72) Inventors: Rémi Du Chalard, Versailles (FR); Amaury Buguet, Versailles (FR); Gabrielle De Puysegur, Dissé-sous-le-Lude (FR); Wandrille Du Chalard, Versailles (FR); Fraçois Outters, Versailles (FR); Zacharie Nataf, Saint-Cloud (FR)

(73) Assignee: Artha France, Versailles (FR)

( * ) Notice: Subject to any disclaimer, the term of this patent is extended or adjusted under 35 U.S.C. 154(b) by 0 days.

(21) Appl. No.: 18/835,251

(22) PCT Filed: Jan. 18, 2023

(86) PCT No.: PCT/EP2023/051121
§ 371 (c)(1),
(2) Date: Aug. 1, 2024

(87) PCT Pub. No.: WO2023/147996
PCT Pub. Date: Aug. 10, 2023

(65) Prior Publication Data
US 2025/0165072 A1       May 22, 2025

(30) Foreign Application Priority Data
Feb. 1, 2022   (FR) ...................................... 2200877

(51) Int. Cl.
*G06F 3/01* (2006.01)
*G06T 7/55* (2017.01)
(Continued)

(52) U.S. Cl.
CPC ................ *G06F 3/016* (2013.01); *G06T 7/55* (2017.01); *G06T 7/73* (2017.01); *G06V 10/25* (2022.01);
(Continued)

(58) Field of Classification Search
CPC ... G06F 3/016; G06T 7/55; G06T 7/73; G06T 2207/10016; G06V 10/25; G06V 20/50; G09B 21/004
See application file for complete search history.

(56) References Cited

U.S. PATENT DOCUMENTS

2008/0120029 A1   5/2008   Zelek et al.
2013/0201308 A1   8/2013   Tan et al.
(Continued)

FOREIGN PATENT DOCUMENTS

CN      111027547 A  *  4/2020   .......... G06K 9/3233
FR       3100636 A1    3/2021
(Continued)

OTHER PUBLICATIONS

International Search Report for Application No. PCT/EP2023/051121 dated Mar. 20, 2023,. 2 pages.
(Continued)

*Primary Examiner* — Stephen G Sherman
(74) *Attorney, Agent, or Firm* — TraskBritt

(57) ABSTRACT
An orientation assistance system comprises means for acquiring a real or virtual visual environment, non-visual human-machine interface means and means for processing the digital representation of the visual environment in order to provide an electrical signal for controlling a haptic
(Continued)

interface. The means for processing the digital representation periodically extracts at least one pulsed digital activation pattern for a subset of spikes of the haptic region. The haptic interface consists of a lumbar belt having an active surface of N×M actuators, where N and M are integers greater than or equal to 10. The processing means provides, for each acquisition of the visual environment, a sequence of P activation frames for the actuators, where P is an integer between 2 and 15, preferably between 5 and 10, each of the frames corresponding to the representation of the environment in an incremental depth plane.

14 Claims, 6 Drawing Sheets

(51) Int. Cl.

| | | |
|---|---|---|
| *G06T 7/73* | (2017.01) | |
| *G06V 10/25* | (2022.01) | |
| *G06V 20/50* | (2022.01) | |
| *G09B 21/00* | (2006.01) | |

(52) U.S. Cl.
CPC .... *G06V 20/50* (2022.01); *G06T 2207/10016* (2013.01); *G09B 21/004* (2013.01)

(56) References Cited

U.S. PATENT DOCUMENTS

| | | | |
|---|---|---|---|
| 2013/0210308 A1 | 8/2013 | Mceneany et al. | |
| 2018/0189567 A1* | 7/2018 | Maheriya | G09B 21/007 |
| 2019/0332175 A1 | 10/2019 | Pukari et al. | |
| 2022/0343795 A1* | 10/2022 | France | G09B 21/004 |

FOREIGN PATENT DOCUMENTS

| | | | | | |
|---|---|---|---|---|---|
| GB | 2487672 A | * | 8/2012 | | A61B 5/11 |
| KR | 20140085734 A | * | 7/2014 | | G06F 1/1686 |
| WO | 2017/151245 A1 | | 9/2017 | | |

OTHER PUBLICATIONS

International Written Opinion for Application No. PCT/EP2023/051121 dated Mar. 20, 2023,. 10 pages with machine translation.

* cited by examiner

Create a constant integer CODE

FOR i from 0 to W

Create variable r = abs $(\frac{2i}{W} - 1)$

Create variable α = arctan $(r \tan (\frac{FOVh}{2}))$

FOR j from 0 to H

Create variable w = M[i,j]*sin(α)

Create variable h $$h = \log_{f(parameters)}(\frac{w}{\tan\alpha} + 1)$$

$$h = \frac{\log(w/\tan\alpha + 1)}{\log(f(parameters))}$$

// h varies with v as

// shown in the previous image, and

// the log function is strictly increasing as a function of $\frac{w}{\tan\alpha} + 1$ IF w > h THEN M[j,i] = CODE END of loop j END of loop i // then "stretch" the matrix row by row to fill in deleted values FOR i from 0 to H Create variable-size list: line = M[i]

Re-sort line items for which: value == CODE

Create double variable: ratio = size(line)/H

Create list with size H: newRow

FOR j from 0 to W newRow[i] = line [floor(ratio*j)] //floor = rounded down

END of loop j

M[i] = newRow

END of loop i

FIG. 8

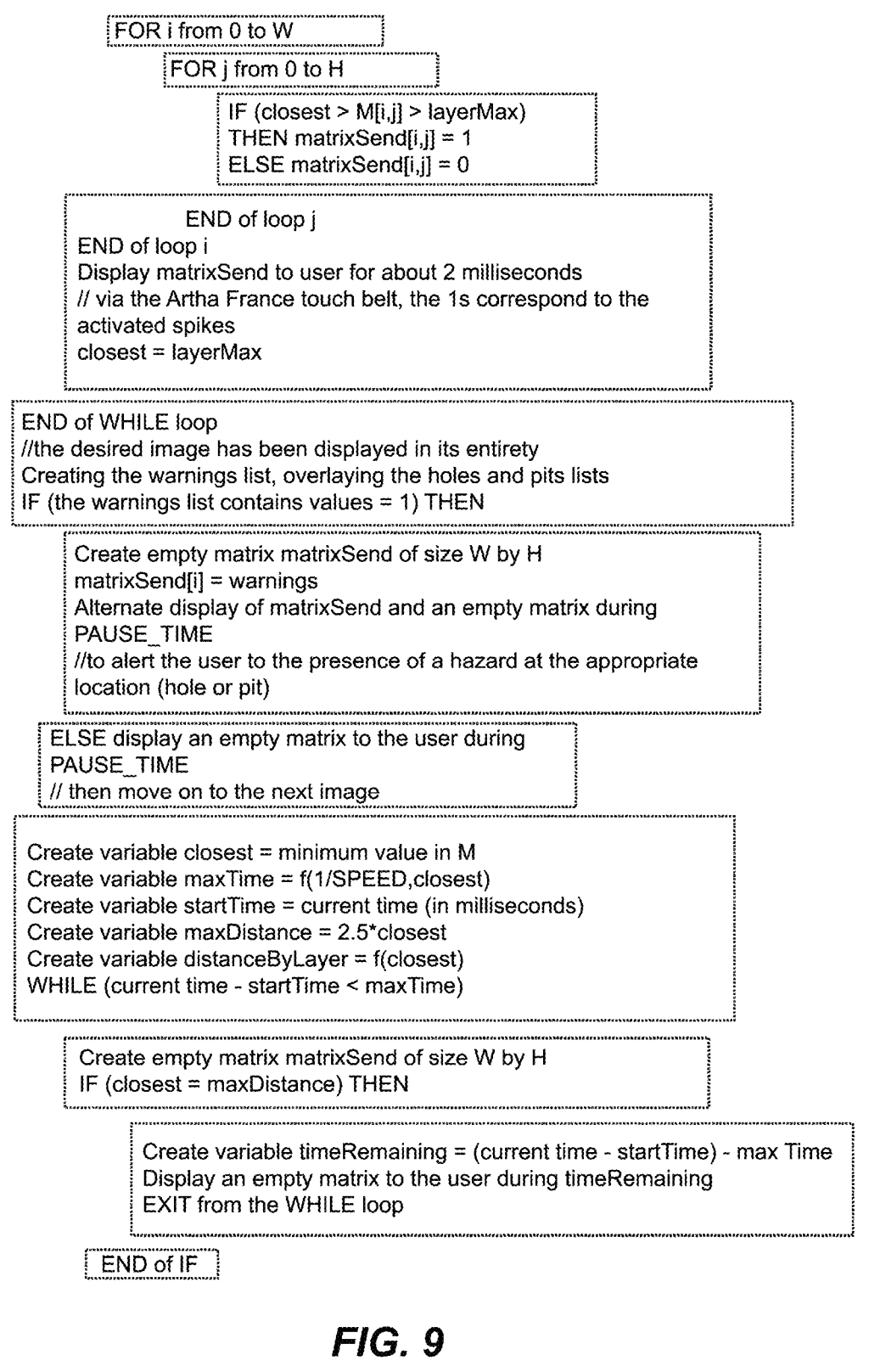

FOR i from 0 to W

FOR j from 0 to H

IF (closest > M[i,j] > layerMax)
        THEN matrixSend[i,j] = 1
        ELSE matrixSend[i,j] = 0

END of loop j
  END of loop i
  Display matrixSend to user for about 2 milliseconds
  // via the Artha France touch belt, the 1s correspond to the
  activated spikes
  closest = layerMax END of WHILE loop
//the desired image has been displayed in its entirety
Creating the warnings list, overlaying the holes and pits lists
IF (the warnings list contains values = 1) THEN Create empty matrix matrixSend of size W by H
    matrixSend[i] = warnings
    Alternate display of matrixSend and an empty matrix during
    PAUSE_TIME
    //to alert the user to the presence of a hazard at the appropriate
    location (hole or pit)

ELSE display an empty matrix to the user during
  PAUSE_TIME
  // then move on to the next image Create variable closest = minimum value in M
Create variable maxTime = f(1/SPEED,closest)
Create variable startTime = current time (in milliseconds)
Create variable maxDistance = 2.5*closest
Create variable distanceByLayer = f(closest)
WHILE (current time - startTime < maxTime)

Create empty matrix matrixSend of size W by H
    IF (closest = maxDistance) THEN Create variable timeRemaining = (current time - startTime) - max Time
        Display an empty matrix to the user during timeRemaining
        EXIT from the WHILE loop END of IF

*FIG. 9*

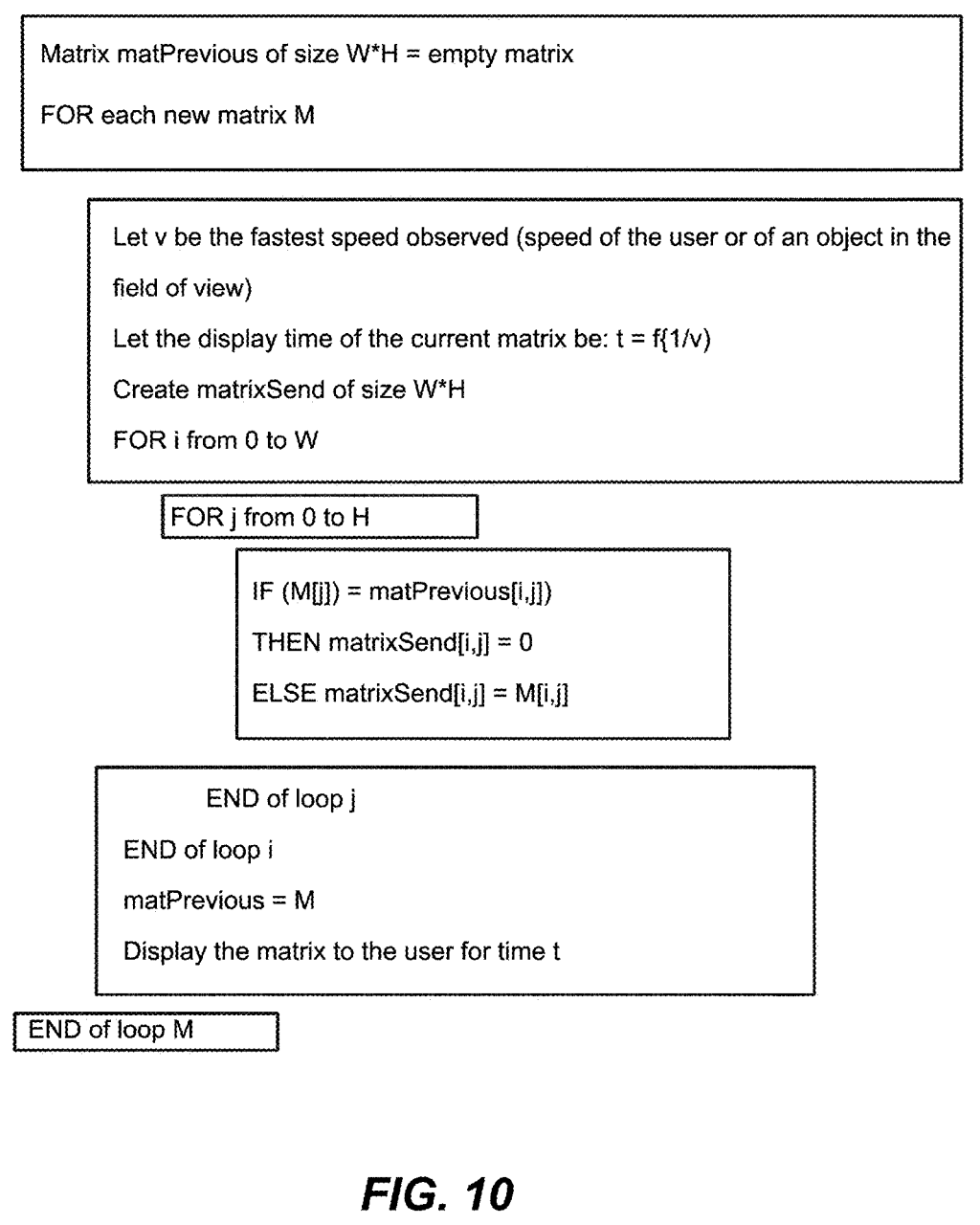

Matrix matPrevious of size W*H = empty matrix

FOR each new matrix M

Let v be the fastest speed observed (speed of the user or of an object in the field of view)

Let the display time of the current matrix be: t = f{1/v)

Create matrixSend of size W*H

FOR i from 0 to W

FOR j from 0 to H

IF (M[j]) = matPrevious[i,j])

THEN matrixSend[i,j] = 0

ELSE matrixSend[i,j] = M[i,j]

END of loop j

END of loop i matPrevious = M

Display the matrix to the user for time t

END of loop M

FIG. 10

ORIENTATION ASSISTANCE SYSTEM COMPRISING MEANS FOR ACQUIRING A REAL OR VIRTUAL VISUAL ENVIRONMENT, NON-VISUAL HUMAN-MACHINE INTERFACE MEANS AND MEANS FOR PROCESSING THE DIGITAL REPRESENTATION OF SAID VISUAL ENVIRONMENT

CROSS REFERENCE TO RELATED APPLICATIONS

This application is a national phase entry under 35 U.S.C. § 371 of International Patent Application PCT/EP2023/051121, filed Jan. 18, 2023, designating the United States of America and published as International Patent Publication WO 2023/147996 A1 on Aug. 10, 2023, which claims the benefit under Article 8 of the Patent Cooperation Treaty to French Patent Application Serial No. FR2200877, filed Feb. 1, 2022.

TECHNICAL FIELD

The present disclosure relates to the field of orientation assistance for visually impaired people or people moving in very low-visibility environments, for example, firefighters moving in a smoke-filled building or military personnel moving in the dark.

BACKGROUND

Various solutions are known, ranging from guide dog assistance to marking the ground with guidance strips, installing audio beacons, or even using canes to detect obstacles.

It has also been proposed to use a haptic mode of information transmission, for example, in the form of a connected wristband. Haptic technology uses the sense of touch to convey information. WearWorks offers a smart bracelet called "Wayband" to guide the blind. The user begins by downloading an application on an associated smartphone and entering the desired address. The bracelet, linked to a GPS system, guides the user to their destination. When the user takes the wrong route, the bracelet vibrates. It stops vibrating once it is on the right track. Tactile language is sensitive, more intuitive and less intrusive, and relieves hearing, an overtaxed sense for the visually impaired.

French Patent FR3100636B1 discloses an orientation assistance system comprising means for acquiring a real or virtual visual environment, non-visual human-machine interface means and means for processing the digital representation of the visual environment to provide an electrical signal for controlling an interface consisting of a bracelet having a single haptic zone with a surface area of between 60×60 millimeters and 150×150 millimeters, with an N×M set of active spikes where N is between 5 and 100 and M is between 10 and 100, the digital representation processing means consisting in periodically extracting at least one pulsed digital activation pattern for a subset of spikes of the haptic zone.

Active belts have also been proposed to increase the surface area of the haptic zone.

US Patent Application Publication No. US2013201308 relates to a visual blind-guiding method, which comprises the following steps:

(1) shooting a black-and-white image, and extracting profile information from the black-and-white image to reduce detail elements and refine the image, so as to obtain an object profile signal;

(2) according to ergonomic features, converting the object profile signal into a serial signal, conveying the serial signal to an image feeling instrument, wherein the image feeling instrument converts the serial signal into a mechanical tactile signal to emit feeler pin stimulation. An intermittent picture touch mode is used with respect to the speed of touch for vision. A feeler pin array enables the visually impaired to touch the shape of an object.

Optionally, this document proposes to probe position information of the object, and to process the position information to obtain and prompt a distance of the object and a safe avoiding direction. The position information probed from the object is processed to obtain and prompt the distance of the object and safe avoiding direction, so that the blind can not only perceive the shape of the object but also know the distance of the object.

US Patent Application Publication No. US2019332175 relates to a wearable electronic haptic vision device configured to be attached to or worn by a user. The wearable electronic haptic vision device is arranged to provide haptic feedback with pressurized air on the user's skin based on objects detected in the user's environment. Information about objects detected in the surroundings is captured using a digital camera, radar and/or sonar and/or a 3D capture device such as a 3D scanner or 3D camera attached to the wearable electronic haptic vision device. The wearable electronic haptic vision device is in the form of a helmet with at least two cameras placed at the user's eye position, or in the form of a t-shirt or other wearable accessory.

Both US Patent Applications Publications mentioned above propose to provide the user with haptic transposition corresponding to the optical image, obtained from a perspective view.

This is, of course, an obvious approach, consisting in compensating for the degradation of one of the senses, sight, by restoring the same information perceptible by another sense, touch.

The problem is that perception of the environment is not limited to "reading" a flat photographic image, but is the result of a complex process involving interpretation by the brain, capable of providing rich information including depth, even when binocular vision is impaired.

Transposing an image into a haptic form does not allow the brain to benefit from this processing, and leads to a confused, unintelligible sensation, with information that is largely overabundant and useless.

BRIEF SUMMARY

In order to remedy the drawbacks of the prior art, the present disclosure relates, in its most general sense, to an orientation assistance installation.

The solution provided by the present disclosure is not to transpose the optical image into a haptic image, but to produce from a given image a succession of slice planes whose active pixels correspond to an obstacle in the activated plane, so as to provide the user with information through a "depth scan" of the environment, with very few spikes activated if the environment is free of obstacles.

The orientation assistance system comprises means for acquiring a real or virtual visual environment, non-visual human-machine interface means and means for processing the digital representation of the visual environment in order to provide an electrical signal for controlling a haptic interface, the digital representation processing means consisting in periodically extracting at least one pulsed digital activation pattern for a subset of spikes of the haptic zone. The haptic interface consists of a lumbar belt with an active surface of N×M spikes whose movement is controlled by actuators, preferably solenoids, where N and M are integers greater than or equal to 10. For each acquisition of the visual environment, the processing means provides a sequence of P activation frames for the actuators, where P is an integer between 2 and 15, preferably between 5 and 10, each frame corresponding to the representation of the environment in an incremental depth plane.

Preferably, the environment acquisition means consist of a spectacle frame carrying one or two cameras.

The present disclosure also concerns a method for processing the digital representation of a visual environment to control a haptic interface consisting of a lumbar belt with an active surface of N×M actuators, N and M being integers greater than or equal to 10, the method involving calculating, for each acquisition of the visual environment, a sequence of P activation frames for the actuators, where P is an integer between 2 and 15, preferably between 5 and 10, each of the frames corresponding to the representation of the environment in an incremental depth plane.

According to one variant, the method comprises a step of calculating a digital image of N and M haptic pixels in a direction offset at a level between 10 and 100 cm from the ground.

According to another variant, the method comprises a step of calculating for each digital image a sequence of P consecutive frames corresponding to incremental depth planes.

Preferably, the step of calculating a digital image of N and M haptic pixels comprises processing consisting in assigning each haptic pixel a density value corresponding to the highest density value of the visual voxels corresponding to the haptic pixel in question.

According to one variant, the step of calculating a digital image of N and M haptic pixels comprises processing consisting in assigning a non-zero density value to the areas of the visual image corresponding to a hole.

According to one variant, the step of calculating a digital image of N and M haptic pixels comprises processing consisting in assigning a non-zero density value to the areas of the visual image corresponding to an obstacle by automatic recognition processing.

According to a particular embodiment, the step of calculating a digital image of N and M haptic pixels comprises processing consisting in eliminating voxels outside a user's traffic lane prior to calculating the digital image of N and M haptic pixels, established from the remaining voxels only.

Preferably, the positions of the voxels are modified according to their depth to take full account of the display capacity.

Preferably, the step of calculating a digital image of N and M haptic pixels comprises processing consisting in reducing the processed voxels as a function of a parameter comprising the user's speed of movement and/or the speed of movement of objects in the field of the visual acquisition means and/or the distance of the objects, prior to calculating the digital image of N and M haptic pixels, established from the voxels remaining only.

In one variant, the method comprises a calculation step to convert distances to the camera into distances to the user.

According to a particular embodiment, the image burst being processed is recalculated in the event of a change in the orientation of the direction of observation of the environment.

BRIEF DESCRIPTION OF THE DRAWINGS

The present disclosure will be described in more detail with reference to non-limiting example embodiments specifying the aforementioned advantages and considerations. A more specific description of the invention will be given briefly below.

FIG. 8 shows example code for processing the horizontal field of view;

FIG. 9 shows example code for the haptic image application; and

FIG. 10 shows example code for the accelerated haptic image application.

DETAILED DESCRIPTION

Figure 1:
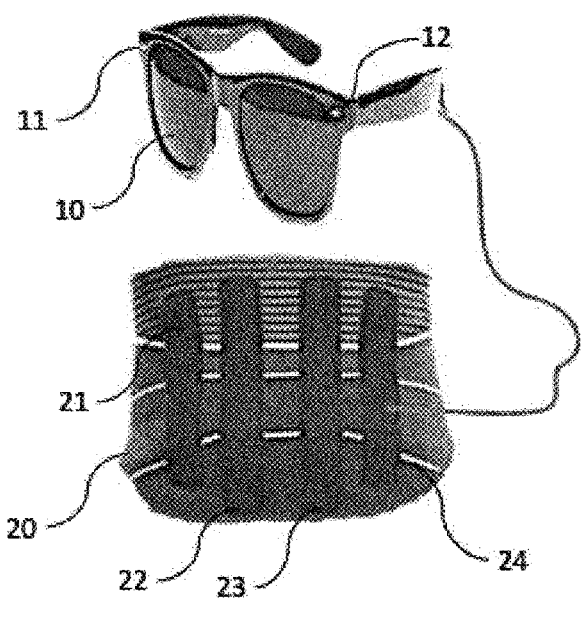
FIG. 1 shows a schematic view of the system according to the present disclosure.

The example developed below, which is non-limiting, comprises a means of acquiring the environment, for example, a spectacle frame (10) equipped with cameras (11, 12) used to acquire data about the environment in real time to provide digital images that control the actions of a haptic transducer, as shown in FIG. 1. The haptic transducer generates actions in the form of pressure on the skin by electromagnetic or electromechanical actuators, or in the form of electrical impulses, or light.

It should be remembered that the system can also be used for augmented reality gaming or training applications, with images provided by a video source.

A computer takes care of retrieving the images from the sensor section, then generates a 3D depth map from them. It transmits this map to haptic equipment, such as a grid of solenoids or spikes (small linear actuators that can be raised or lowered), integrated into a back belt (20). This belt (20) is equipped with a set of solenoids arranged on supports (21 to 24) to form a matrix, for example, of 20×40 pixels. These solenoids are arranged to form a regular matrix, preferably with a constant pitch. An electronic circuit receives the visual signals and processes them to control the solenoids, producing sensations on the user's back that are easy to interpret after a learning period. The lumbar belt (20) can be worn on a light fabric garment (shirt, polo shirt, blouse) or directly on the skin.

The surface of the active matrix formed by the solenoids covers an extended lumbar region, for good resolution and comfort of use.

Rendering the image of the real environment into haptic images consists in dividing the depth map calculated from the visual image into a multiple successive layers, each of which determines a virtual or haptic image controlling the activation of the haptic equipment: thus, the closest objects are displayed first, followed by slightly more distant objects, and so on, until the maximum viewing distance is reached (usually around 10 meters). This forms a kind of scan of the environment, which gradually sinks in and displays what it encounters at every moment. This scan results in a burst of virtual images lasting around 100 milliseconds, made up of around ten haptic images corresponding to consecutive planes, before resuming with a new burst corresponding to the new environment, resulting from the user's movement or the change in orientation of the real image, due to a change in the position of the head or the video image.

Visual Image Processing

Figure 2:
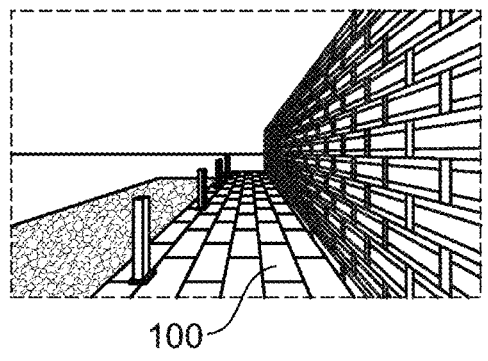
FIG. 2 shows a view of a visual image.
Figure 3:
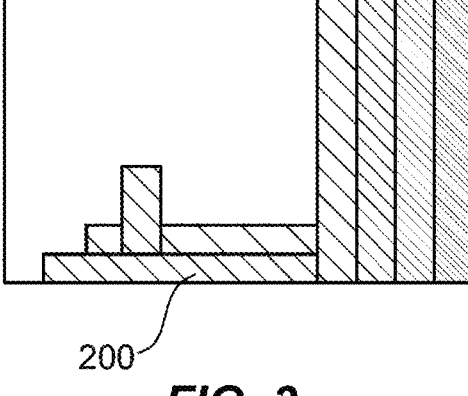
FIG. 3 shows a view of a haptic image.

The cameras (11, 12) acquire binocular images to reconstruct a digital image with depth information. The first step is to build a grayscale image. For each pixel of the visual image (100) (FIG. 2), a haptic image (200) (FIG. 3) is transcribed in grayscale depending on the distance of each point from the camera.

Depth information can also be determined using a single camera with appropriate image processing.

It should be noted that this haptic image (200) could also, without departing from the present disclosure, be calculated from the digital image supplied by a lidar.

Figure 4:
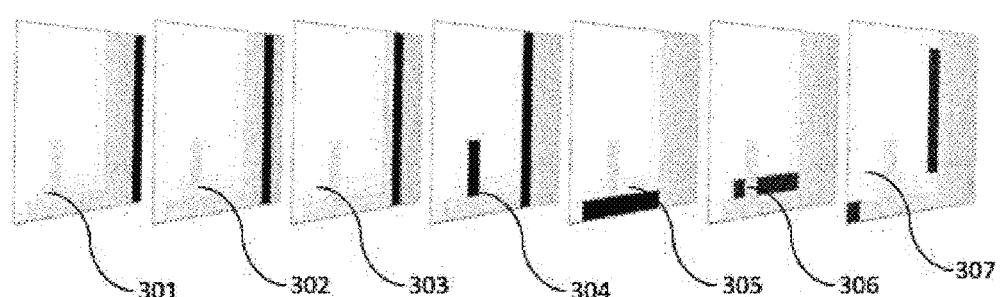
FIG. 4 shows a view of a sequence of haptic frames.

This haptic image (200) is then broken down into a sequence of incremental haptic frames (301 to 307) (FIG. 4), each corresponding to a depth plane. The first haptic frame (301) of the sequence corresponds to the obstacle zones in the plane closest to the user, the second first haptic frame (301) of the sequence corresponds to the obstacle zones in the plane closest to the user, the following haptic frame (302) corresponds to the obstacle zones in the next plane, offset from the previous one by one step, for example, by 30 centimeters in distance and so on.

The grayscale of the haptic frames (301 to 307) encodes the type of action of the corresponding solenoid, for example, the frequency of the vibration or the duration of the vibration during the activation time of the corresponding haptic frame.

A haptic image (200) is thus translated into a temporal scan of haptic frames (301 to 307) that are integrated by the user to perceive a depth representation of his environment.

Other treatments are applied to improve the intelligibility of tactile perceptions:

Correction of the visual image (100) to create a synthetic image based on observation along a horizontal axis lowered to the level of the user's legs, a few tens of centimeters above the ground;

Enhancement of pixels corresponding to small obstacles in the visual image (100), to occupy at least one pixel in the haptic image (200);

Reprocessing the holes to enhance the grayscale of the corresponding area on the haptic image (200); and Grayscale enhancement on haptic image (200) of area of interest determined by automatic recognition, e.g., by supervised learning.

Examples of processing for producing the haptic image (200)

Examples of processing are described below, with the following variables:

M denotes the haptic matrix applied to the user

H denotes the height of the haptic matrix M (in pixels)

W denotes the width of the haptic matrix M (in pixels)

p is the precision level

DM denotes the depth map retrieved by the sensors (11, 12)

dmH denotes the height of the recovered depth map (in pixels)=p*H dmW denotes the width of the recovered depth map (in pixels)=p*W FOVv denotes the vertical field of view of the camera used (in degrees)

FOVh denotes the horizontal field of view of the camera used (in degrees)

hu denotes the height at which the camera is placed (user height taken at eye level)

DISTANCE_MAX is the maximum viewing distance set by the user

SPEED denotes the display speed set by the user

PAUSE_TIME denotes the pause time between the display of 2 images (set by the user)

MAT[x, y] corresponds to the value of the matrix MAT at coordinates [x, y]

MAT[x] corresponds to the xth column of the matrix MAT LIST[x] corresponds to the xth value of the LIST list x=f(arguments) means that the value of x is a function of 1 or more arguments (proportionality relationship)

\\ means that what follows is a comment

Step 1: Obtaining a Depth Map

This first step consists of calculating a depth map of size dmW*dmH from the two images acquired by cameras (11) and (12) or by lidar, or by a binocular virtual image source.

There are well-known forms of processing, generally comprising:

a. A step for acquiring two images of the same scene at the same time by two cameras (11, 12) whose spacing is known, or successive images from the same sensor;

b. A calibration step consisting of determining the internal and external parameters of the geometric model of the stereoscopic sensor;

c. A pixel matching step to find pairs of pixels on the two images that correspond to the projection of the same scene element; and d. A 3D reconstruction step consisting in calculating for each pixel the position in space of the point that has projected onto this pixel.

The result of this first step is a visual image (100) of size dmW*dmH where each point is a voxel defined by its coordinates in space, with the origin at the user's head, the x and y axes perpendicular to the cameras' line of sight, and the z coordinate the distance from the user's head.

The positions of the voxels are adapted to the depth, to take full advantage of the haptic display capability.

Reduced Matrix Resolution without Loss of Important Information

The aim of this processing is to reduce the size of the depth map retrieved by the sensor to the size of the lumbar display (the spike matrix). The problem with conventional resolution reduction is that some information can be lost. For example, if a very narrow pole is in front of the user, it might not be displayed, which would be a major safety issue. To remedy this problem, the following resolution reduction algorithm is used, which has the advantage of keeping the closest (and therefore most important) object in each zone. This algorithm takes as input the depth map of resolution dmW*dmH and returns a matrix of resolution W*H.'

This processing can be executed by the following code:

```
FOR i from 0 to H (excluded)
FOR j from 0 to W (excluded)
Create an empty list
FOR k from 0 to p (excluded)
FOR l from 0 to p (excluded)
Add DM[p*i+k, p*j+l] to the list
END of loop l
END of loop k
```

-continued

```
Sort list by ascending values
M[j, i] = first quartile of list (= list[list size /4])
END of loop j
END of loop i
```

Ground Hole Detection Processing

For a user, spotting a pothole by perceiving the absence of activation of certain solenoids is not easy, as the absence of information is very hard to perceive. One solution is to identify the holes and modify the grayscale of the corresponding pixels in the haptic image. Such processing can be carried out by a program whose algorithm, which locates the holes and sends their position to the display section, is detailed below:

```
Create a list of integers of size W: holes
Let m be the margin of error (at least 20%)
FOR i from 0 to W (excluded)
Create variable dMax = (hu/sin(FOVv/2))
IF M[i, H−1] > dMax*(1+margin/100) THEN holes[i] = 1
ELSE holes[i] = 0
END of loop i
Transmission of holes to the display section
```

In the same way, thanks to artificial intelligence and image processing, a "pits" list of the positions of obstacles too small to be displayed (root, thin sidewalk, etc.) can be generated.

Distance Conversion

Another process involves converting distances to the camera into distances to the user.

Human perception of distance is based on the whole body, not the eyes. This conversion is normally carried out intuitively by the brain. In the context of the present disclosure, this correction is carried out upstream to simplify the process of perception by the skin, via processing whose algorithm is, for example, as follows.

```
FOR i from H/2 to H (excluded)
```

$$r = \frac{2i}{H} - 1$$

```
Create variable
```

$$\propto \ = \arctan\left(r\tan\left(\frac{FOV_v}{2}\right)\right)$$

```
FOR j from 0 to W (excluded)
M[j,i] = cos(α) M[j,i]
END of loop j
END of loop i
"Tunnel vision" processing
```

Our eyes perceive everything visible in our field of vision, but our brain does not process all the information; this is the difference between seeing and looking.

Figure 5:
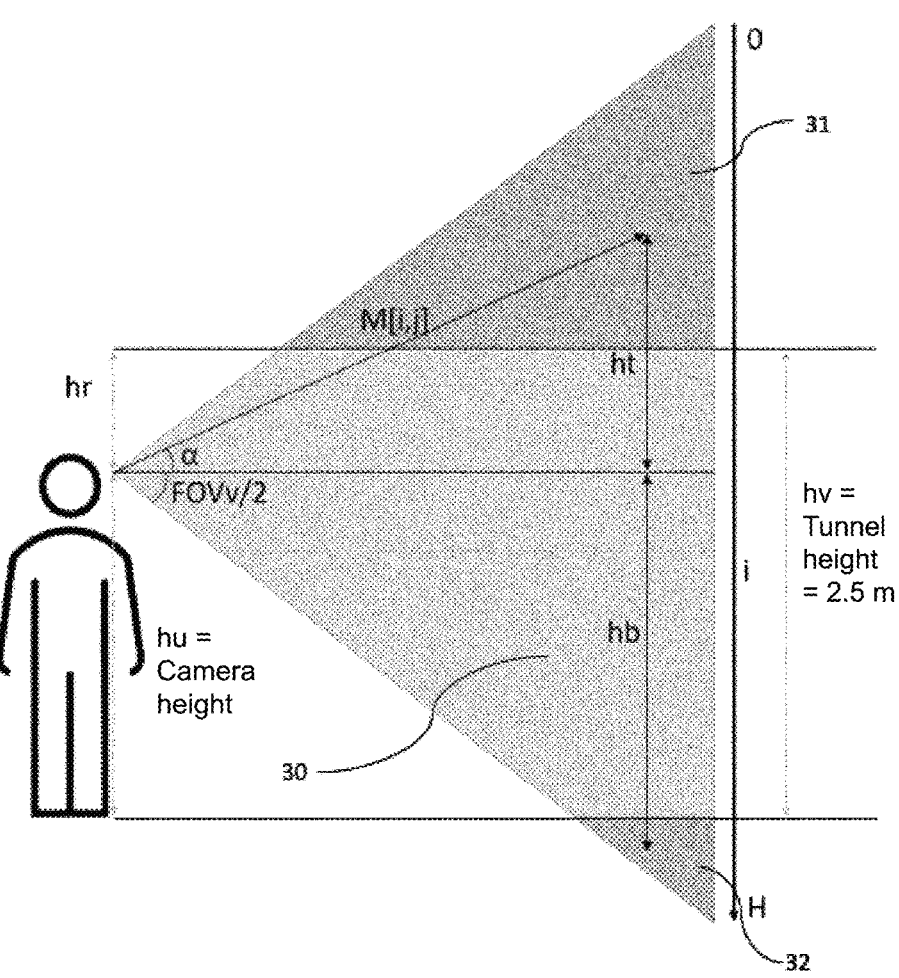
FIG. 5 shows a schematic view of a vertical tunnel.

To avoid information overload, the invention provides processing to limit information only to obstacles present in a "virtual corridor" (30) in front of the user, and removes information (31, 32) of little use (see FIG. 5). It then readjusts the truncated matrix, so that the information retained uses the entire display matrix.

This processing is carried out by a program corresponding to the following algorithm:

```
// replace the values to be deleted with a constant, "CODE"
Create a constant integer CODE
FOR i from 0 to H (excluded)
```

$$r = \text{abs}\left(1 - \frac{2i}{H}\right)$$

```
Create variable
```

$$\propto \ = \arctan\left(r\tan\left(\frac{FOV_v}{2}\right)\right)$$

```
IF i < H/2 then
Create variable ht
FOR j from 0 to W
ht = M[j,i]*sin(α)
IF ht > (hv − hu)
THEN M[j,i] = CODE
END of loop j
END of IF
ELSE
Create variable hb
FOR j from 0 to W
hb = M[j,i]*sin(α)
IF hb > hu THEN M[j,i] = CODE
END of loop j
END of ELSE
END of loop i
// then "stretch" the matrix column by column to fill in deleted values
FOR i from 0 to W
Create variable-size list: column = M[i]
Remove elements from column for which: value == CODE Create
double variable: r = size(column)/W
Create list with size W: newColumn
FOR j from 0 to H
newColumn[j] = column[floor(r*j)] //floor = rounded down
END of loop j
M[i] = newColumn
END of loop i
"Horizontal field of view" processing
```

As with the vertical axis detailed above, the full horizontal field of view is not always useful, and can lead to information overload. However, certain information must not be lost, which is why a corridor is not defined here as it was previously. Here, vision reduction is dependent on multiple parameters targeted in the algorithm:

User speed

Object speed

Object distance

Figure 6:
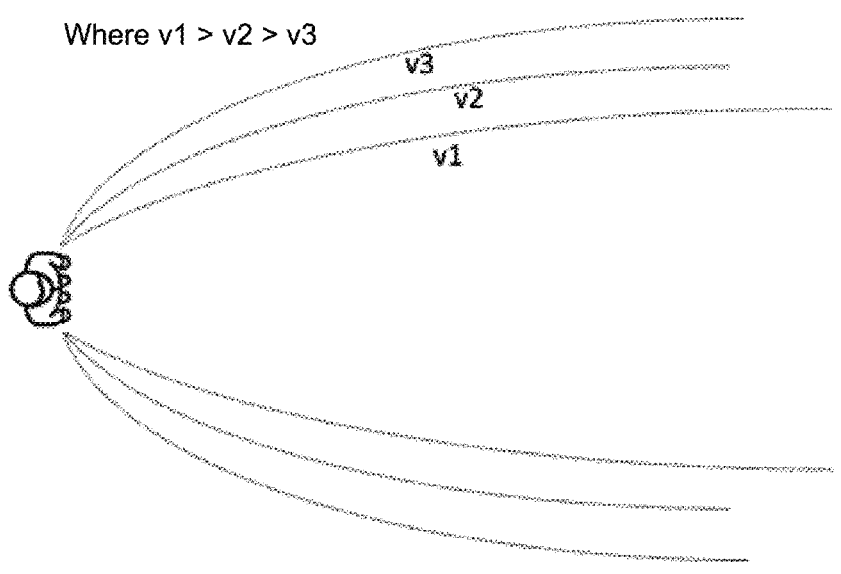
FIG. 6 shows a schematic view of the field of view as a function of travel speed.
Figure 7:
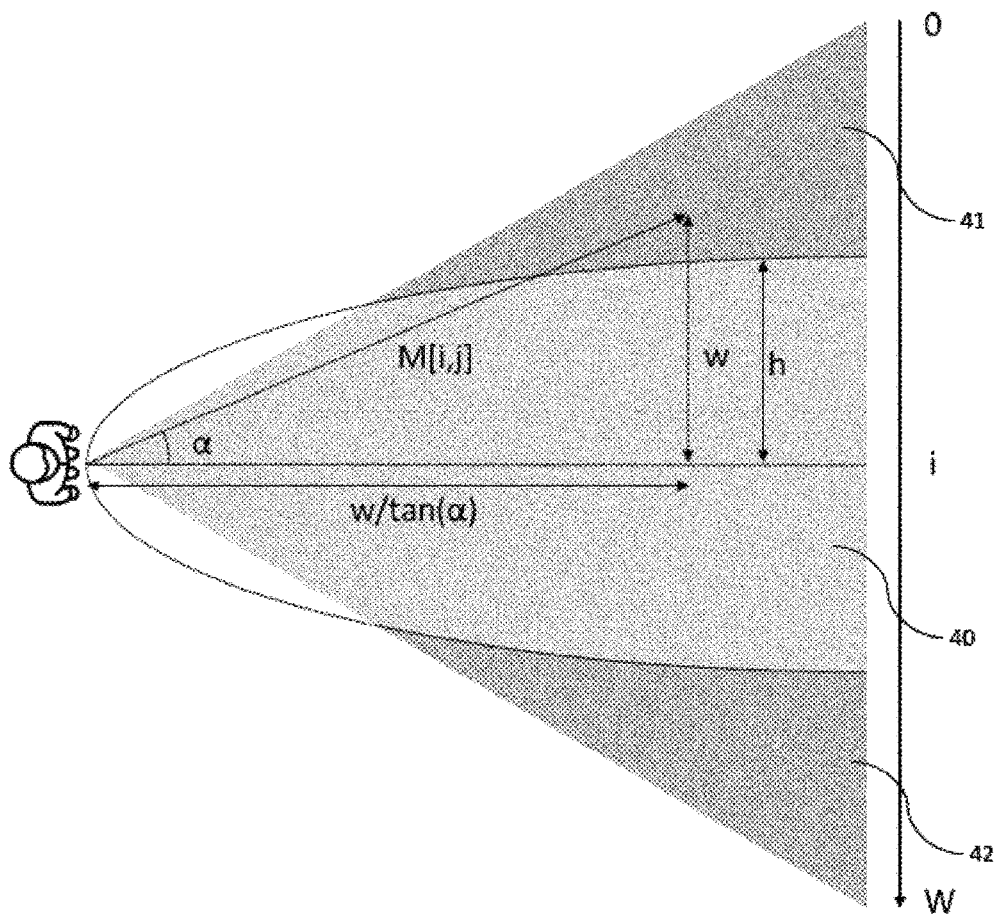
FIG. 7 shows a schematic view of a horizontal tunnel.

FIG. 6 shows the top view: The faster the user's speed v, the narrower the field of view. FIG. 7 shows the eliminated zones (41, 42) and the preserved zone (40).

The processing algorithm is described in FIG. 8.

Matrix Application Processing

In this display, everything depends on the distance to the nearest object in the field of view. Three values are derived from it:

maxTime: defines the time it should take to display the entire image (the display moves on to the next image if the time has elapsed), allowing the user to intuitively know if he is close to an obstacle.

maxDistance: defines the maximum viewing distance. The algorithm focuses on the nearest objects to avoid information overload. For example, if the nearest obstacle is 1 m from the user, then the program will only display obstacles between 1 and 2.5 m away.

distanceByLayer: To display an image in 3D, the algorithm will successively display 2D layers very quickly. For example, it displays a first layer with objects between 0 and 30 cm, then those between 30 cm and 60 cm, and so on. To keep this distance consistent with the context, it evolves in proportion to closest(?).

FIG. 9 shows an example of this algorithm.

Dynamic Display

For users who wish to do so, a display mode is available that is faster but requires more learning.

In this mode, the algorithm in charge of the display only updates variations in the current matrix compared to the previous one. So if everything is static, nothing will be displayed, but as soon as an object or the user moves, the user will see the changes. This processing is shown in FIG. 10.

Motion Blur

The matrix sent to the user may update before it has been completely displayed, and continue to be displayed. A burst is displayed in approximately 100 milliseconds. If the user turns his head while the sequence is being applied, one variant is to recalculate the virtual images and apply the modified burst from the new camera orientation.

Customizing Settings

The tactile sensitivity of the dorsal zone and the intelligibility of haptic excitations vary from one individual to another. In order to make it easier for a user to learn and grasp this guidance mode, the invention optionally provides a settings layer to optimize adaptation to a particular user. This settings software layer consists in determining how to convert the real image into virtual images corresponding to the depth layers, in particular, the periodicity of bursts, the duration of haptic application of each virtual depth image, the possible introduction of a virtual image at the beginning and/or end of a burst, the resolution of virtual images, etc.

These parameters can be defined by a supervised learning process, using a reference path and taking into account the user's type of error.

The invention claimed is:

1. An orientation assistance system, comprising:
means for acquiring a real or virtual visual environment;
non-visual human-machine interface means comprising a haptic interface; and
means for processing the digital representation acquired from a single acquisition of the visual environment to provide an electrical signal for controlling the haptic interface, the means for digital representation processing configured to periodically extract at least one pulsed digital activation pattern for a subset of spikes of the haptic interface, wherein:
the haptic interface comprises a lumbar belt with an active surface of N×M spikes, where N and M are integers greater than or equal to 10; and
the means for processing provides, for each single acquisition of the visual environment, a sequence of P activation frames for the spikes, where P is an integer between 2 and 15, each frame corresponding to the digital representation of the visual environment in an incremental depth plane, with the sequence of P activation frames being delivered in a burst for the single acquisition.

2. The orientation assistance system of claim 1, wherein the spikes are activated by solenoids.

3. The orientation assistance system of claim 1, wherein the means for acquiring a real or virtual visual environment comprise a spectacle frame carrying one or two cameras.

4. A method of processing a digital representation of a visual environment to control a haptic interface comprising a lumbar belt with an active surface of N×M actuators, N and M being integers greater than or equal to 10, the method comprising: acquiring the visual environment and, for each single acquisition, calculating a sequence of P activation frames for the actuators, where P is an integer between 2 and 15, each of the frames corresponding to the digital representation of the visual environment in an incremental depth plane, with the sequence of P activation frames being delivered in a burst for the single acquisition.

5. The method of claim 4, further comprising calculating a digital image of N and M haptic pixels in a direction offset at a level of between 10 and 100 cm from the ground.

6. The method of claim 5, further comprising calculating for each digital image a sequence of P consecutive frames corresponding to incremental depth planes.

7. The method of claim 5, wherein calculating the digital image of N and M haptic pixels comprises processing involving assigning each haptic pixel a density value corresponding to a highest density value of visual voxels corresponding to a respective haptic pixel.

8. The method of claim 5, wherein calculating the digital image of N and M haptic pixels comprises processing involving assigning a non-zero density value to an area of the visual image corresponding to a hole.

9. The method of claim 5, wherein calculating the digital image of N and M haptic pixels comprises processing involving assigning a non-zero density value to an area of the visual image corresponding to an obstacle by automatic recognition processing.

10. The method of claim 5, wherein calculating the digital image of N and M haptic pixels comprises processing involving eliminating voxels outside a traffic lane of a user prior to calculating the digital image of N and M haptic pixels, the digital image being established from only remaining voxels.

11. The method of claim 5, wherein calculating the digital image of N and M haptic pixels comprises processing involving reducing processed voxels as a function of a parameter comprising a speed of movement of a user and/or a speed of movement of objects in a field of view of the visual acquisition means and/or a distance of objects in the field of view of the visual acquisition means, prior to calculating the digital image of N and M haptic pixels, the digital image being established from only remaining voxels.

12. The method of claim 4, further comprising transforming distances of objects relative to a camera into distances of the objects relative to a user.

13. The method of claim 4, further comprising detecting a change in orientation of a direction of observation of the environment by a user, and processing involving recalculating the digital representation of the visual environment.

14. The method of claim 4, further comprising modifying positions of voxels according to respective depths of the voxels.

\* \* \* \* \*